United States Patent [19]

Kaneko et al.

[11] Patent Number: 4,805,017
[45] Date of Patent: Feb. 14, 1989

[54] SYSTEM FOR CODING AND TRANSMITTING MOTION IMAGE SIGNALS

[75] Inventors: Masahide Kaneko, Yokohama; Kiichi Matsuda, Kawasaki; Naoki Mukawa, Yokosuka; Toshio Koga, Tokyo, all of Japan

[73] Assignees: Kokusai Denshin Denwa Co., Ltd., Tokyo; Fujitsu Limited, Kawasaki; Nippon Telegraph and Telephone Corporation; NEC Corporation, both of Tokyo, all of Japan

[21] Appl. No.: 21,909

[22] Filed: Mar. 4, 1987

[30] Foreign Application Priority Data

Mar. 4, 1986 [JP] Japan ................. 61-47125

[51] Int. Cl.$^4$ ..................... H04N 7/18; H04N 7/12
[52] U.S. Cl. ..................... 358/105; 358/135; 358/136; 375/27
[58] Field of Search ..................... 358/105, 135, 136; 375/27

[56] References Cited

U.S. PATENT DOCUMENTS

| | | |
|---|---|---|
| 3,761,613 | 9/1973 | Limb . |
| 4,077,053 | 2/1978 | Ishiguro ..................... 358/136 |
| 4,218,704 | 8/1980 | Netravali et al. ..................... 358/136 |
| 4,232,338 | 11/1980 | Netravali et al. ..................... 358/136 |
| 4,245,248 | 1/1981 | Netravali et al. ..................... 358/136 |
| 4,281,344 | 7/1981 | Mounts et al. ..................... 358/136 |
| 4,460,923 | 7/1984 | Hirano et al. ..................... 358/136 |
| 4,562,468 | 12/1985 | Koga ..................... 358/136 |
| 4,591,907 | 5/1986 | Catros ..................... 358/136 |
| 4,661,849 | 4/1987 | Hinman ..................... 358/136 |
| 4,689,671 | 8/1987 | Okki et al. ..................... 358/135 |

FOREIGN PATENT DOCUMENTS

| | | |
|---|---|---|
| 115780 | 9/1980 | Japan . |
| 158784 | 12/1980 | Japan . |
| 041069 | 3/1982 | Japan . |
| 199379 | 12/1982 | Japan . |
| 2128847 | 5/1984 | United Kingdom . |

Primary Examiner—James J. Groody
Assistant Examiner—John K. Peng
Attorney, Agent, or Firm—Staas & Halsey

[57] ABSTRACT

A motion compensation difference interframe or intraframe coding system includes a block data redundancy compression and coding unit, a PIXEL data coding unit and a prediction data generator unit. The block data redundancy compression and coding unit codes a motion compensated (MC) difference between an input image in a block and a motion predicted image from the prediction data generator unit, and transmits coded data to a receiver. The PIXEL data coding unit receives an error between the MC difference and a decoded MC difference from the block data redundancy compression and coding unit, rearranges the error in PIXEL data and codes the PIXEL error, when the error is greater than a predetermined value. The PIXEL coded data is also transmitted to the receiver. The prediction data generator unit generates predicted block data of the motion of the image. The redundancy compression and coding unit may include a filter circuit rejecting pulse components contained in the MC difference.

16 Claims, 12 Drawing Sheets

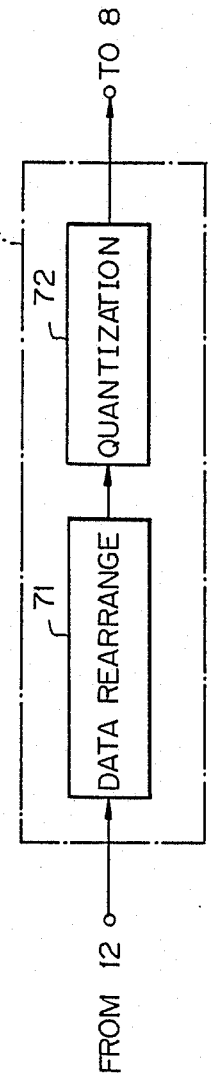
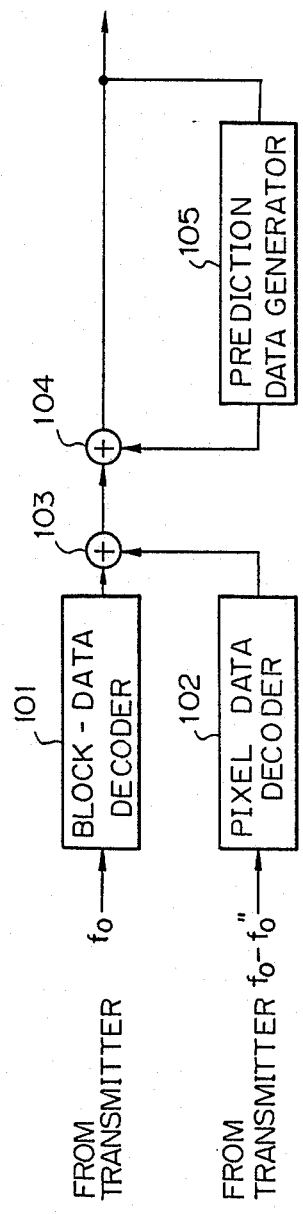

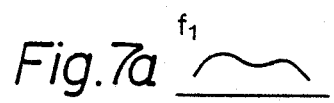 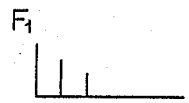
Fig.7a  $f_1$  $\underset{T^{-1}}{\overset{T}{\rightleftarrows}}$  $F_1$  Fig.7d
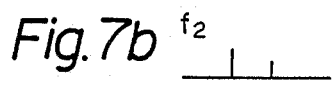 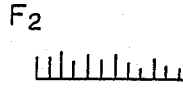
Fig.7b  $f_2$  $\underset{T^{-1}}{\overset{T}{\rightleftarrows}}$  $F_2$  Fig.7e
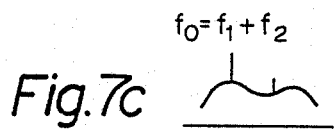 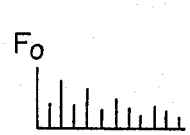
Fig.7c  $f_0 = f_1 + f_2$  $\underset{T^{-1}}{\overset{T}{\rightleftarrows}}$  $F_0$  Fig.7f
 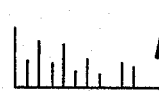
$[F_0''] \geq Th2$     $\geq Th1 \ [F_0']$
Fig.7g      Fig.7h
Fig.7j
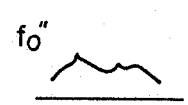
$T^{-1}$  Fig.7i
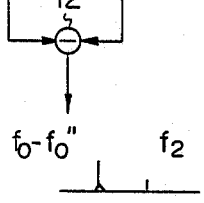
$f_0''$
12
$f_0 - f_0''$   $f_2$   Fig.7k
$\downarrow \geq Th3$
$[f_0 - f_0'']$   Fig.7ℓ

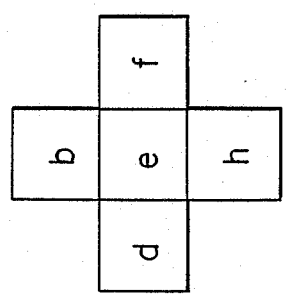
Fig. 11
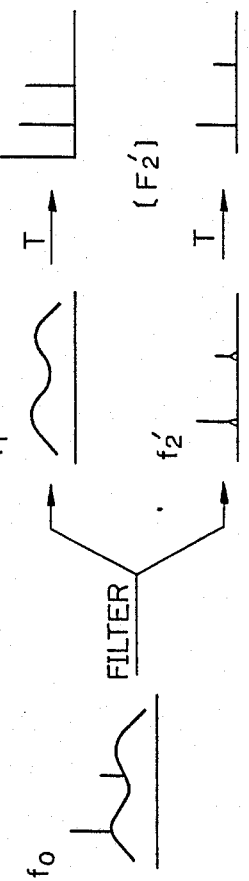
Fig. 12a
Fig. 12b
Fig. 12c
Fig. 12d
Fig. 12e

SYSTEM FOR CODING AND TRANSMITTING MOTION IMAGE SIGNALS

BACKGROUND OF THE INVENTION

1. Field of the Invention

The present invention relates to a data communication system for transmitting and receiving motion (moving) image data. More particularly, it relates to a system for coding and transmitting motion image data, such as image data of a television (TV) telephone (conference) system, with a high efficiency in a form of interframe (frame-to-frame) difference coded signals or in a form of motion compensation interframe code signals.

2. Description of the Related Art

Generally, the image on, for example, a TV display unit, consists of a large amount of image data. In order to transfer such image data economically, a variety of data compression technologies have been attempted. In this connection, the means for reducing redundancy (correlation) in time and space of input image signals, reducing information on amplitude components, and thus expressing the input image signals with as as possible as an amount of data small, are generally known as high efficiency coding or redundant compression coding.

The data compression technologies are briefly classified into two categories: a prediction coding method, such as interframe coding, intra-frame coding, differential pulse coded modulation (DPCM), vector quantization coding, etc.; and an orthogonal transform method, such as a Walsh-Hadamard transform, a discrete Fourier transform, etc. In the prediction coding method, the prediction of picture elements (PIXELs) is effected on the basis of the correlation of adjacent PIXELs, and errors in predicted values are coded so that the amount of information to be transferred for each PIXEL can be reduced. In the orthogonal transform method, an orthogonal transform of PIXEL groups is carried out to obtain statistical deviations of the spectrum given by the transform, and quantization level numbers are suitably assigned to the statistical deviations so that the amount of information to be transferred can be reduced.

In a TV telephone system, image data is changed with a time lapse, but the change of the image data may be a partial for a short period and also may be somewhat slow. On the basis of these features of the image data, a further method which obtains intra-frame or interframe difference signals or motion-compensated (MC) interframe difference signals and codes and transmits these difference signals, is available to further reduce the redundancy of the motion image signals in a time axis direction. The difference methods have been attempted for a system coding PIXELs, and for another system coding blocks each consisting of a plurality of PIXELs and formed in a matrix form.

JPA No. 55-115780, published on Sept. 9, 1980, discloses a prediction coding system for television signals which codes differences for PIXELs and is provided with a noise filter for decreasing quantization errors due to a rough quantization of prediction errors.

JPA No. 55-158784, published on Dec. 10, 1980, discloses an interframe coding apparatus which codes differences for each block consisting of a plurality of PIXELs and reduces the amount of calculation needed by dividing the detection of motion vectors into multi-steps.

JPA No. 57-41069, published on Mar. 6, 1982, discloses an interframe coding system which codes each PIXEL or each block and is provided with a code error detection circuit for reducing transfer data errors.

JPA No. 57-199379, published on Dec. 7, 1982, discloses a vector coding apparatus which codes and decodes motion vectors represented by two-dimensional vectors, with a high efficiency.

U.S. Pat. No. 4,077,053 discloses a television signal encoder utilizing a correlation between frames which corrects coding errors in an interframe coding process by low-bit interframe coding with a limited increase in the volume of coding information. The encoder includes a first quantization circuit, a predictor, and a second quantization circuit for detailed quantifying of interframe coding errors output from the first quantization circuit.

As set forth above, prior art MC interframe difference systems provide improved data compression. On the other hand, these prior art systems process either each PIXEL or each block consisting of a plurality of PIXELs. Note, the motion image data of the TV telephone system may have a variety of changes in time. The PIXEL MC interframe difference system and the block MC interframe difference system respectively have advantages and disadvantage with regard to the motion image data. That is, the prior art MC interframe difference systems still suffer from the disadvantage of poor image quality, such as large distortion and noise.

The above disadvantages will be described in more detail with reference to a specific example.

Also, an improvement of the system for achieving a relatively high compression of data, and an inexpensive transmission charge, etc. is required.

SUMMARY OF THE INVENTION

An object of the present invention is to provide a motion compensation difference coding system providing a more effective coding of a motion compensation difference with a small bit rate and improving the quality of the image given by the coded data.

Another object of the present invention is to provide a decoding system suitably decoding a source image in response to coded data from the motion compensation difference coding system.

According to the present invention, there is provided a motion compensation difference coding system including: a compression coding unit for compression-coding a motion difference and decoding coded data; an error coding unit, operatively connected in series to the compression-coding and decoding unit, for coding an error between the motion difference and the decoded data and decoding the error coded data when the error exceeds a predetermined value; and a predicting unit, operatively connected in parallel to the series-connected compression coding and error coding and units, for predicting motion of an input image in response to a decoded data of an input image calculated using the decoded data from the compression coding unit and the decoded data from the error coding unit, a preceding motion input image therefrom, and the input image. The motion difference is calculated as a difference between the input image data and the motion predicted image data from the motion predicting unit.

The motion predicting unit may be connected in parallel to the compression-coding and decoding unit.

The compression-coding and decoding unit may further include a filter for removing pulse components contained in the motion difference, so that the compression-coding and decoding decodes the motion difference from which the pulse components have been removed.

According to another aspect of the present invention, there is also provided a decoding system including: a unit for receiving a data coded difference between a source image data and a predicted image data and decoding the coded data to another difference corresponding to the first difference; a unit for receiving a data coded error between the difference used for the data coding and the decoded difference and decoding the error coded data to another error; and a unit, operatively connected to the first and second units, for restoring the source image data in response to the other difference and error.

BRIEF DESCRIPTION OF THE DRAWINGS

Other objects and features of the present invention will be described below in detail with reference to the accompanying drawings; in which:

FIGS. 4b and 4c are block diagrams of examples of the block data decoder shown in FIG. 3;

FIGS. 5a to 5d are views of the distribution of coefficients obtained at a two-dimensional orthogonal transform shown in FIG. 4a;

FIG. 6 is a circuit diagram of a PIXEL data coder shown in FIG. 3;

FIGS. 7a to 7l are views illustrating the principle coding operation of the motion compensation interframe difference coding system shown in FIG. 3;

FIG. 8 is a block diagram of a receiver of an embodiment according to the present invention;

FIG. 11 is a view explaining the operation of the filter circuit shown in FIG. 10;

FIGS. 12a to 12e are graphs explaining the operation of the motion compensation interframe difference coding system shown in FIG. 11;

DESCRIPTION OF THE PREFERRED EMBODIMENTS

Before describing the preferred embodiments of the present invention, an example of a prior art system relevant to the prior art techniques described above will be described with reference to the drawings, for comparison.

Figure 1:
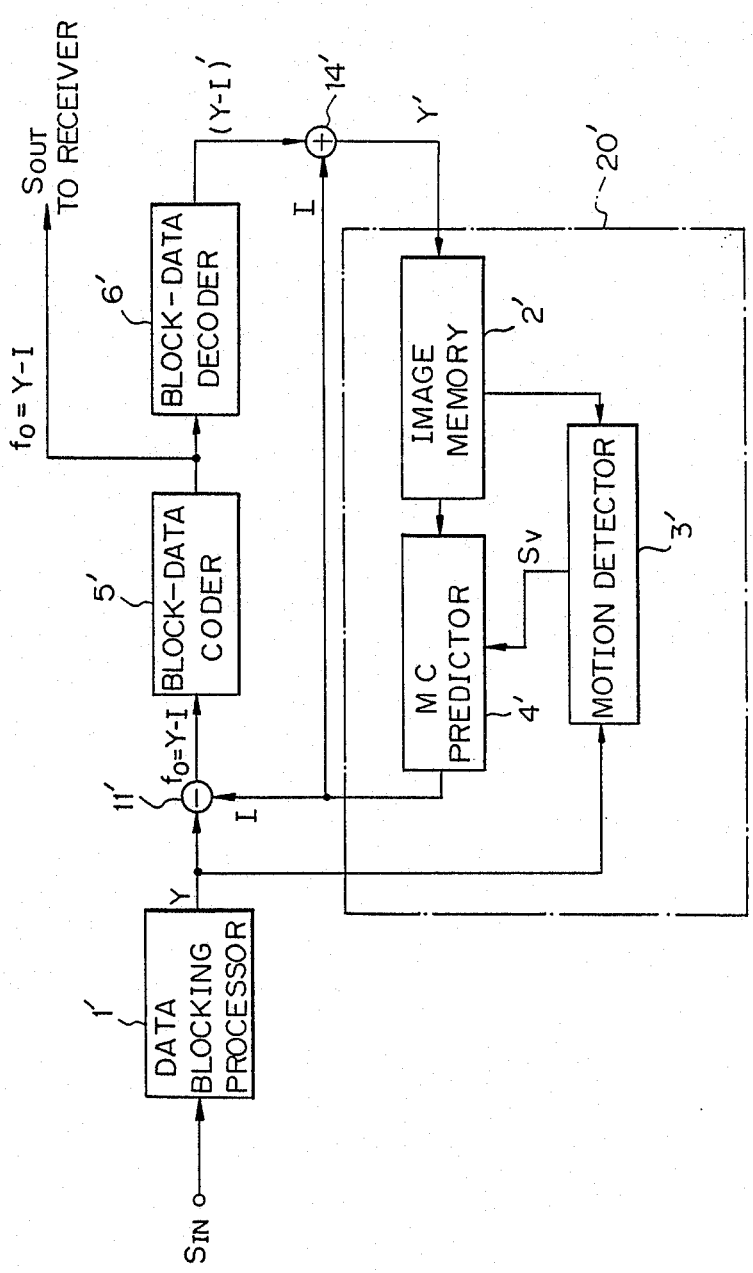
FIG. 1 is a block diagram of a motion compensation interframe difference coding system of the prior art.

Referring to FIG. 1, a motion compensation interframe difference (MCID) coding system in a transmitter includes a data blocking processor 1', a prediction block image data generator unit 20' having an image memory 2', a motion detector 3', and a motion compensated (MC) predictor 4', a block-data coder 5', a block-data decoder 6', a subtractor 11', and an adder 14'. The data blocking processor 1' receives an input (a source) image signal $S_{IN}$ consisting of a plurality of PIXEL data, and rearranges the PIXEL data to generate a plurality of block data Y each consisting of a plurality of PIXEL data, for example, $4 \times 4$ PIXEL data. The image memory 2' has a capacity of at least one frame of the PIXEL data. Note, one frame of the PIXEL data contains a plurality of PIXEL data of one TV screen. The motion detector 3' seeks a block data position closest to the input block data and outputs a vector signal $S_V$ to the MC predictor 4'. The sought block data may be the preceding block data corresponding to the input block. The vector signal $S_V$ has a motion distance and a direction therefor. The MC predictor 4' may be a variable delay device, more specifically, for example, a random access memory (RAM). Upon receipt of the vector signal $S_V$, the MC predictor 4' outputs a motion predicted data I, the subtractor 11' calculates a motion compensated (MC) block difference $f_0 = Y - I$, and the block-data coder 5' carries out the coding of the MC block difference to compress the redundancy. The coding may be a two-dimensional orthogonal transform, as described in detail hereinafter. The coded signal is output to a receiver as an output data $S_{OUT}$. The coded signal is also supplied to the block-data decoder 6' and decoded thereat. The decoded signal $(Y-I)'$ is added to the MC block different I at the adder 14, and thus a decoded image data Y' is obtained. The decoded image data Y' is stored in the image memory 2' and can be used for calculating the MC block difference.

Note, since the MC block difference is obtained by the interframe difference in a direction of the time axis or the interframe difference compensating for the motion of the code-objective PIXELs between the preceding frame and the current frame, the redundancy contained in the TV screen is considerably reduced. As a result, the nature of the MC block difference differs from the image data in the frame. In other words, due to the motion of the PIXELs to be coded, the degree of change between the preceding image and the current image, and the appearance or disappearance of background portions, etc, there may be (a) portions where the values are small and the variation is slight, (b) portions where the values are large and abruptly changed, or (c) portions where the values are large, but the variation thereof is relatively small, i.e., portions where the motion compensation is not suitable, etc.

In the above case (b), this generally appears in a state wherein it is mixed with the case (a) in the block.

Figure 2:
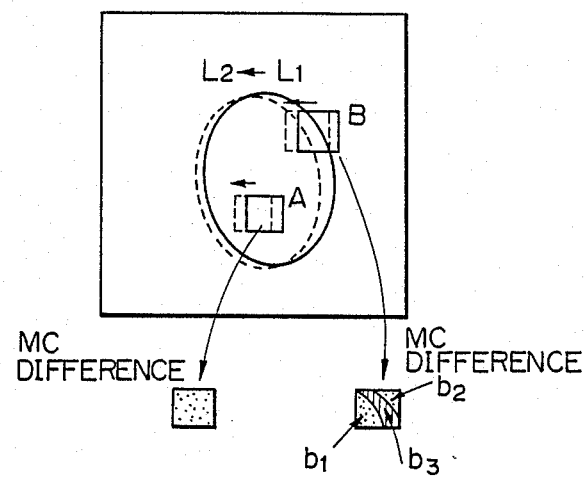
FIG. 2 is a view illustrating the characteristics of motion compensation interframe differences.

The cases (a) and (b) will be described in more detail with reference to FIG. 2. In FIG. 2, an image object at a portion $L_1$ moves to another portion $L_2$ by a distance U in a frame. Upon investigating block A, corresponding areas between the preceding frame when the image object is at the portion $L_1$ and the current frame when the image object is at the portion $L_2$ are found, and accordingly, the MC difference of the block may be small. Conversely, upon investigating block B, the background between the preceding frame and the current frame is greatly changed due to the motion of the image object. As a result, an abrupt change of the MC difference at a portion $b_3$ with respect to the adjacent portions $b_1$ and $b_2$ occurs. In this case, a correlation of the MC difference between the PIXELs becomes low. Experimentally, a value of the correlation is approximately 0.4 to 0.6. This value, of course, may be changed by patterns of the input motion images.

When the orthogonal transform of the MC differences having the above nature is carried out, the following results will be obtained; note, "significant transform coefficients" below means orthogonal transformed coefficients greater than a certain threshold:

(aa) few significant coefficients exist in the above case (a), (bb) significant coefficients are concentrated at low order portions in the above case (c), or (cc) significant coefficients lay over low order portions to high order portions, in the above case (b).

In the cases (aa) and (bb), a highly effective coding of the MC difference can be achieved.

In the case (cc), much information representing the many significant coefficients is needed, but is limited to a resonable number from the view point of data compression. The reduction of the information representing the significant coefficients can be attempted by, for example, a coding which neglects higher order coefficients and codes only lower order coefficients, or another coding which roughly quantizes the significant coefficients. However, in these coding methods, a large amount of noise is generated by the coding, resulting in a low quality of the decoded images at the receiver or the generation of additional large MC differences.

The above is discussed in the case where the two-dimensional orthogonal transform and coding is applied to the MC differences. When usable information is extremely limited, the two-dimensional orthogonal transform and coding should be for a group of the MC differences, and thus the above defects will be increased. In addition, when a vector quantization transforming likely patterns at each block is applied to the MC difference, the number of block patterns facilitating the vector quantization is also limited, and accordingly, a precise coding of the MC differences having the above nature is difficult. Both cases suffer from these defects.

The television signal encoder utilizing a correlation between frames, as disclosed by U.S. Pat. No. 4,077,053, alleviates the above defects, but still suffers from disadvantages.

Now, preferred embodiments of the present invention will be described.

Figure 3:
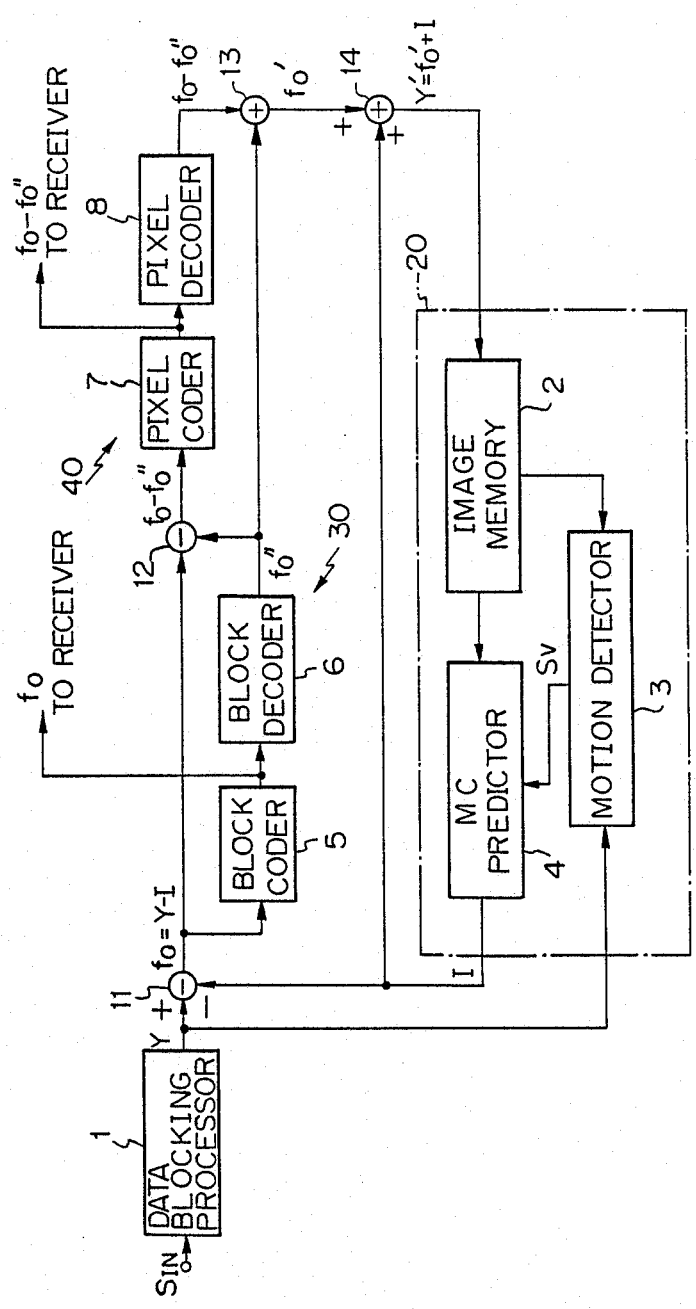
FIG. 3 is a block diagram of an embodiment of a motion compensation interframe difference coding system according to the present invention.

FIG. 3 is a block diagram of an embodiment of a motion compensation interframe difference (MCID) coding system. The coding system includes a data blocking processor 1, a block data redundancy compression and coding unit 30 having a block data coder 5 and block data decoder 6, a PIXEL data coding unit 40 connected in tandem to the block data redundancy compression and coding unit 30 and having PIXEL data coder 7 and a PIXEL data decoder 8, and a prediction block data generator unit 20 having an image memory 2, a motion detector 3, and a MC predictor 4, as main elements.

The operation of the coding system shown in FIG. 3 now be described.

The data blocking processor 1 is similar to the data blocking processor 1', and accordingly, receives an input (a source) image singal $S_{IN}$ of a plurality of PIXEL data and outputs a plurality of block data Y each consisting of a plurality of PIXEL data and formed in a matrix, for example, 4×4 PIXEL data. The block data Y is supplied to a subtractor 11 and the motion detector 3 in the prediction block data generator unit 20. The prediction block data generator unit 20 is similar to the prediction block data generator unit 20', and thus outputs a predicted block data I to the subtractor 11. The subtractor 11 outputs a block MC difference $f_0$, i.e. difference between the input image block data Y and the predicted image block data I: $f_0 = Y - I$. The block MC difference $f_0$ is subjected to the redundancy compression and coding in the block data coder 5. The coded signal is output to the receiver as a block coded data and supplied to the block data decoder 6. The decoder 6 decodes the coded data from the coder 5 as a decoded data $f_0''$, for restoring the MC difference.

Figure 4A:
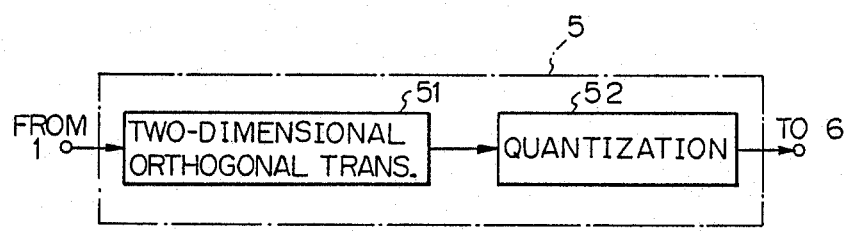
FIGS. 4a and 4b are block diagrams of examples of b block data coder shown in FIG. 3.
Figure 4B:
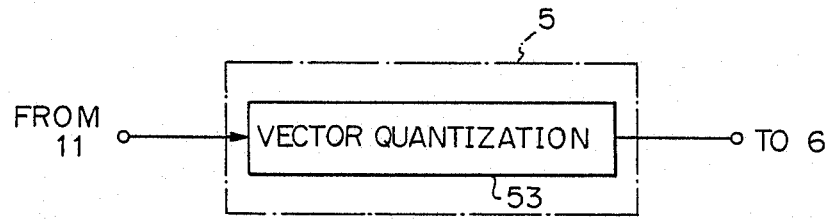

The coding at the block data coder 5 can be realized by a circuit as shown, for example, in FIG. 4a or 4b.

The block data coder 5 shown in FIG. 4a includes a two-dimensional orthogonal transformer 51 and a quantizer 52. The two-dimensional orthogonal transformer 51 carries out the two-dimensional orthogonal transform of the block data received from the subtractor 11.

Note, the two-dimensional orthogonal transform is now briefly defined. The following transform is a so-called "two-dimensional unitary transform".

$$X' = Am \cdot X \cdot An^t \tag{1}$$

where,
X: images of M×N PIXELs
Am: a unitary matrix
An: a unitary matrix
t: a transposition If the unitary matrixs Am and An have an orthogonal relationship, the above transform is called a "two-dimensional orthogonal transform".

Referring back to FIG. 4a, when the high efficiency coding is carried out, the preferably two-dimensional orthogonal transform may be a "Walsh-Hadamard transform" shown below, a "discrete cosine transform" also shown below, or a "discrete Fourier transform". The two-dimensional orthogonal transformer 51 executes the Walsh-Hadamard transform, the discrete cosine transform or the discrete Fourier transform. The size of the orthogonal matrix may be 4×4 PIXELs.

Walsh-Hadamard Transform (Walsh-Order)

$$\frac{1}{2}\begin{bmatrix} 1 & 1 & 1 & 1 \\ 1 & 1 & -1 & -1 \\ 1 & -1 & -1 & 1 \\ 1 & -1 & 1 & -1 \end{bmatrix}$$

Discrete Cosine Transform $$\frac{1}{2}\begin{bmatrix} 1 & 1 & 1 & 1 \\ \sqrt{2}\cos\frac{\pi}{8} & \sqrt{2}\cos\frac{3}{8}\pi & -\sqrt{2}\cos\frac{3}{8}\pi & -\sqrt{2}\cos\frac{\pi}{8} \\ 1 & -1 & -1 & 1 \\ \sqrt{2}\cos\frac{3}{8}\pi & -\sqrt{2}\cos\frac{\pi}{8} & \sqrt{2}\cos\frac{\pi}{8} & -\sqrt{2}\cos\frac{3}{8}\pi \end{bmatrix}$$

Figure 5A:
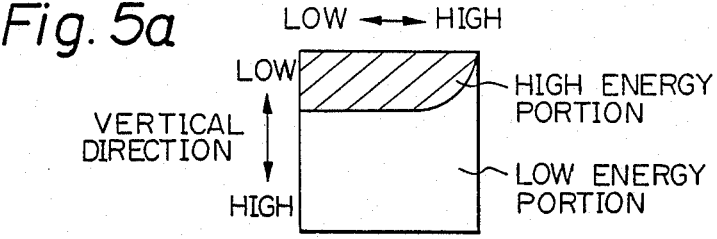
Figure 5B:
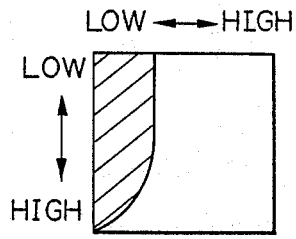
Figure 5C:
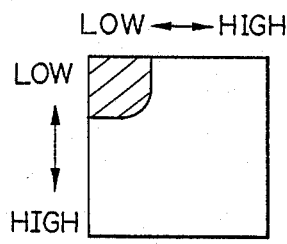
Figure 5D:
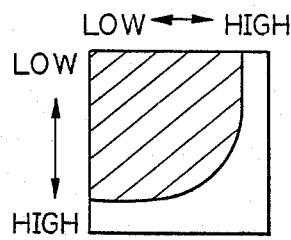

When the data is correlated, coefficients obtained by the above transform show a special pattern. For example, if the block data has a large change in a horizontal direction in the frame, and a small change in a vertical direction in the frame, the coefficients concentrate at low order portions of the energy in a vertical direction in the transform domain, as shown in FIG. 5a. If the block data has a large change in a vertical direction in the frame, and a small change in a horizontal direction in the frame, the coefficients are distributed at the low order portions in a horizontal direction in the transform domain, as shown in FIG. 5b. If the block data has a small change in both directions, the coefficients are distributed as shown in FIG. 5c. Conversely, if the block data has a large change in both directions, the coefficients are distributed as shown in FIG. 5d.

Generally, threshold coding and zone coding are known as transform coding.

Referring again to FIG. 4a, the quantization circuit 52 has a plurality of coefficient distribution patterns, as shown in FIGS. 5a to 5d, previously designed by taking into account the correlation of the image data and the frequency of occurrence of the patterns. The number of patterns is, for example, 512. The quantization circuit 52 receives the orthogonal transformed coefficients, finds the closest pattern, and outputs an index corresponding to the closest pattern. Accordingly, the output $f_0$ has an index between 0 an 511. The output has only nine bits representing 0 to 511, and thus the input block data of $4\times4$ PIXELs is greatly reduced.

Figure 4C:
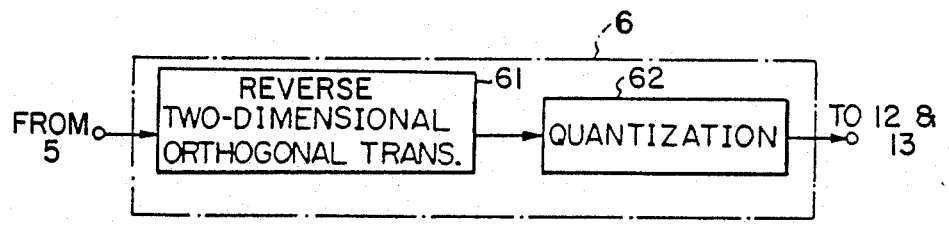
Figure 4D:
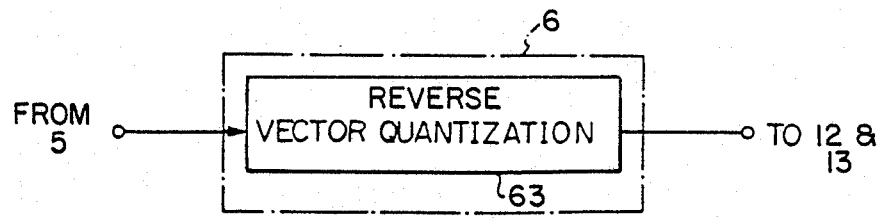

Referring back to FIG. 3, the block data decoder 6 receives the index and restores the input block data by performing a reverse two-dimensional orthogonal transform in response to the index as illustrated in FIG. 4c.

The vector quantization circuit 53 in FIG. 4b effects a vector quantization of the PIXELs in a block by a known method. The block data decoder 6 restores the amplitudes of the PIXELs in the block as illustrated in FIG. 4b.

Referring again to FIG. 3, errors between the MC difference $f_0$ from the substractor 11 and the decoded value $f_0''$ from the block data decoder 6 are calculated at a subtractor 12. As described above, smoothly changing components contained in the MC difference are fully encoded at the block data encoder 5. Then, abruptly changing components should be PIXEL-coded. The PIXEL data coder 7 receives the errors ($f_0-f_0''$) and encodes the PIXEL data.

FIG. 6 is a circuit diagram of the PIXEL data coder 7. The PIXEL data coder 7 includes a data rearrange processor 71 and a PIXEL quantization circuit 72. The data rearrange processor 71 inputs the errors ($f_0-f_0''$) in a form of a block and rearranges the same as sequential PIXEL data. The PIXEL quantization circuit 72 performs the quantization of the PIXEL data. The PIXEL coded signal of the error is also output to the receiver and to the PIXEL data decoder 8.

The PIXEL coding differs from a normal PIXEL coding for directly coding an MC difference of PIXEL data, and thus a coded signal has a smaller number of bits than a normal coded signal. The PIXEL data decoder 8 receives the PIXEL coded signal from the PIXEL data coder 7 and performs the reverse-quantization of the received signal, restoring amplitudes of the error.

The output from decoder 8 ($f_0-f_0''$) of the error is added to the output $f_0''$ at an adder 13. The adder 13 outputs a decoded value $f_0'$ corresponding to the MC difference $f_0$. The decoded value $f_0'$ is added to the predicted block data I at an adder 14. A data ($f_0'+I$) is supplied to the prediction block data generator unit 20.

The prediction block data generator unit 20 is similar to the generator unit 20' shown in FIG. 1 and generates a predicted block data I. The image memory 2 has a capacitor for storing at least one frame PIXEL data and stores the data ($f_0'+I$). The motion detector 3 detects a distance between the input block data from the data blocking processor 1 and a block data closest to the input block data, stored in the image memory 2, and a direction therefor. The motion detector 3 outputs a vector signal $S_V$ containing the above distance and the direction. The MC predictor 4, which may be a RAM, outputs prediction block data I in response to the vector signal $S_V$.

The above operation may be repeated.

The above operation is now described in principle with reference to FIGS. 7a to 7l.

When the MC difference $f_1$ changes smoothly as shown in FIG. 7a, orthogonal transformed values of the MC difference can be represented by a small amount of transformed coefficients as $F_1$, as shown in FIG. 7d. On the other hand, if the MC difference $f_2$ changes abruptly as shown in FIG. 7b, the transformed coefficients $F_2$ lie over a wide range from a low order to a high order as shown in FIG. 7e. Normally, the MC difference $f_0$ is mixed with $f_1$ and $f_2$ due to the change of the image object, the function of the motion compensation. If the two-dimensional orthogonal transform is applied to the MC difference $f_0$, transformed coefficients $F_0$ lying over a wide range will be given as shown in FIG. 7f. If the transformed coefficients $F_0$ greater than a threshold Th1 are quantized and coded, many bits are required as shown in FIG. 7h, Accordingly, first the transformed coefficients greater than another threshold Th2, where the threshold Th2 is greater than the threshold Th1, are coded at the block-data coder 5. The coded data $F_0''$ is shown in FIG. 7g. The coded data $F_0''$ is reverse-orthogonal transformed in the block-data decoder 6 as shown in FIG. 7i, resulting in the $f_0''$ as shown in FIG. 7j. The coded data $f_0''$ is not always equal to the data $f_0$, but roughly represents the components of $f_1$. Therefore, the output ($f_0-f_0''$) from the subtractor 12 is akin to $f_2$ as shown in FIG. 7k. The data ($f_0-f_0''$) higher than a threshold Th3 is coded at the PIXEL data coder 7 as shown in FIG. 7l. The block coded data $f_0$ from the block-data coder 5 and the PIXEL coded data ($f_0-f_0''$) from the PIXEL data coder (if required) are transmitted to the receiver. As a result, the MC difference is totally and efficiently coded and a high quality image will be reproduced at the receiver.

FIG. 8 is a block diagram of the receiver. The receiver includes a block data decoder 101 having a similar structure to the block data decoder 6 shown in FIG. 3, a PIXEL data decoder 102 having a similar structure to the PIXEL data decoder 8, adders 103 and 104 and a prediction PIXEL data generator 105 having a similar structure to the generator 20. The block data decoder 101 receives the block code data $f_0$ from the block data coder 5, and the PIXEL data decoder 102 receives the PIXEL code data ($f_0-f_0''$) from the PIXEL data coder 7. The receiver reproduces the PIXEL data input to the data blocking processor 1 in FIG. 3.

Figure 9:
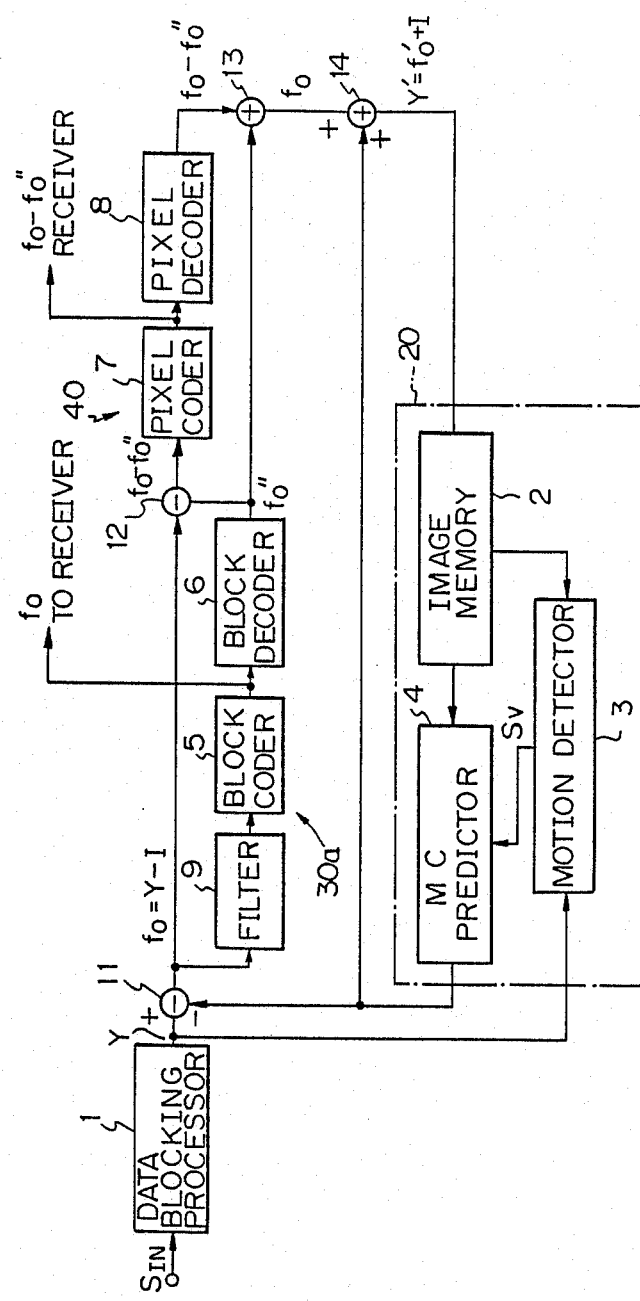
FIG. 9 is a block diagram of another embodiment of a motion compensation interframe difference coding system according to the present invention.

Another embodiment of a motion compensation interframe difference (MCID) coding system is described with reference to FIG. 9. The MCID coding system in FIG. 9 is provided with a filter circuit 9 in a block data redundancy compression and coding unit 30a in addition to the MCID coding system shown in FIG. 3.

In the MCID coding system shown in FIG. 3, if the block data has pulse components, as an example of abrupt signals, accurate coded data of the block data is not always obtained because the pulse components are not correlated. The MCID coding system shown in FIG. 9 rejects the pulse components contained in the block data from the data blocking processor 1 at the filter circuit 9 and supplies the filtered block data to the block data coder 5, thus obtaining accurate coded data.

Figure 10:
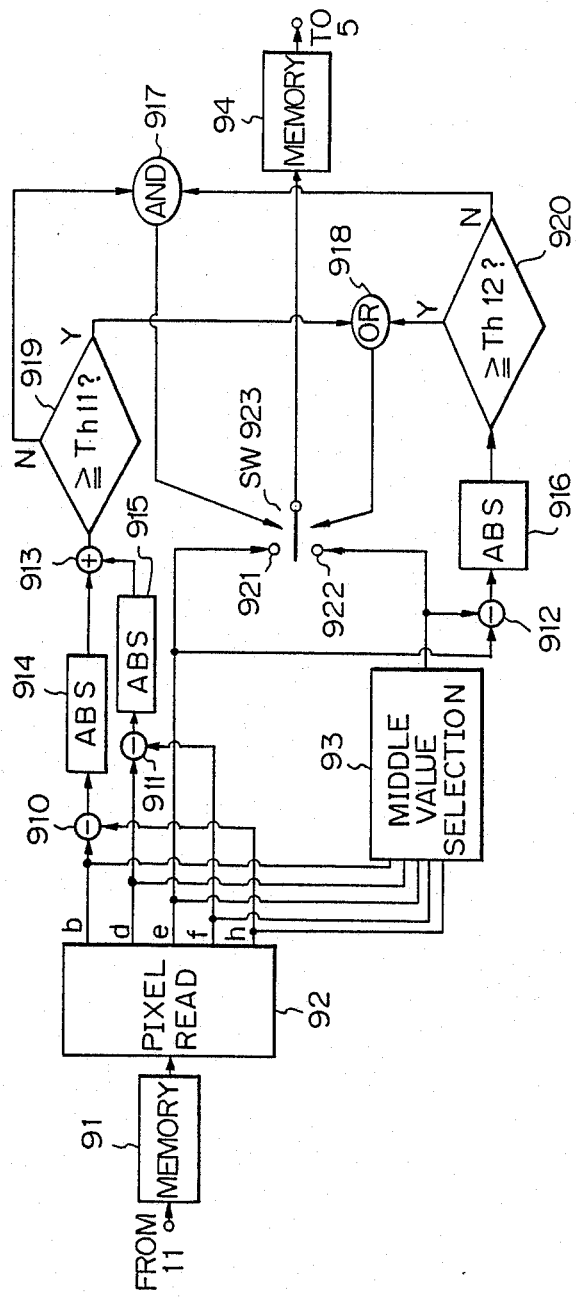
FIG. 10 is a circuit diagram of a filter circuit shown in FIG. 9.

An example of the filter circuit 9 is illustrated in FIG. 10. The filter circuit 9 includes a memory 91 storing the PIXEL data in a block form, a PIXEL data read-out circuit 92 reading the PIXEL data from the memory 91, a middle value PIXEL selection circuit 93, and a memory 94 storing the filtered results. The filter circuit 9 also includes subtractors 910 and 912, an adder 913, absolute value circuits 914 to 916, an AND circuit 917, an OR circuit 918, compare circuits 919 and 920, a switch 923, and terminals 921 and 922 for the switch 923.

The PIXEL data read-out circuit 92 reads a center PIXEL e and adjacent PIXELs b, d, f and h, shown in FIG. 11. With respect to a portion where the value abruptly changes, the following operation is performed to replace the PIXEL with a middle value PIXEL of the five PIXELs b, d, e, f and h:

(1) when $|b-h|+|d-f| \geq Th1$, a middle value PIXEL of b, d, e, f and h is selected,
(2) when $|b-h|+|d-f| > Th11$, e is selected,
(3) when $|e-(\text{middle value PIXEL of, b, d, e, f and h})| \geq Th12$, the middle value PIXEL of b, d, e, f and h is selected.

The subtractor 910 calculates $(b-h)$, and the absolute value circuit 914 outputs the absolute value $(b-h):|b-h|$. The subtractor 911 calculates $(d-f)$, and the absolute value circuit 915 outputs the absolute value $|d-f|$. The adder 913 sums $|b-h|+|d-f|$, and the sum $|b-h|+|d-f|$ is compared with the threshold value Th11 at the compare circuit 919. If the sum is greater than the threshold Th11, the switch 923 is energized, and thus connected to the terminal 922, by a signal from the compare circuit 919 through the OR circuit 918. As a result, the output from the middle value PIXEL selection circuit 93 is stored in the memory 94. According to the above operation, the operation of the above case (1) is executed. The operations of the above cases (2) and (3) are also executed in the same way.

The operation of the MCID coding system having the above filter circuit in FIG. 9 will be briefly described with reference to FIGS. 12a to 12e. The MC difference $f_0$ containing pulse components, as abruptly changing components, as shown in FIG. 12a is filtered. A difference $f_1'$ with the pulse components removed as shown in FIG. 12b is orthogonal-transformed and coded at the block-data coder 5, resulting in a block coded data $F_1'$ as shown in FIG. 12d. Conversely, another difference $f_2'$ containing the pulse components as shown in FIG. 12c is PIXEL-coded at the PIXEL data coder 7, also resulting in a PIXEL coded data $F_2'$ as shown in FIG. 12e. In this way, due to the provision of the filter circuit 9, the coding is further improved.

Figure 13:
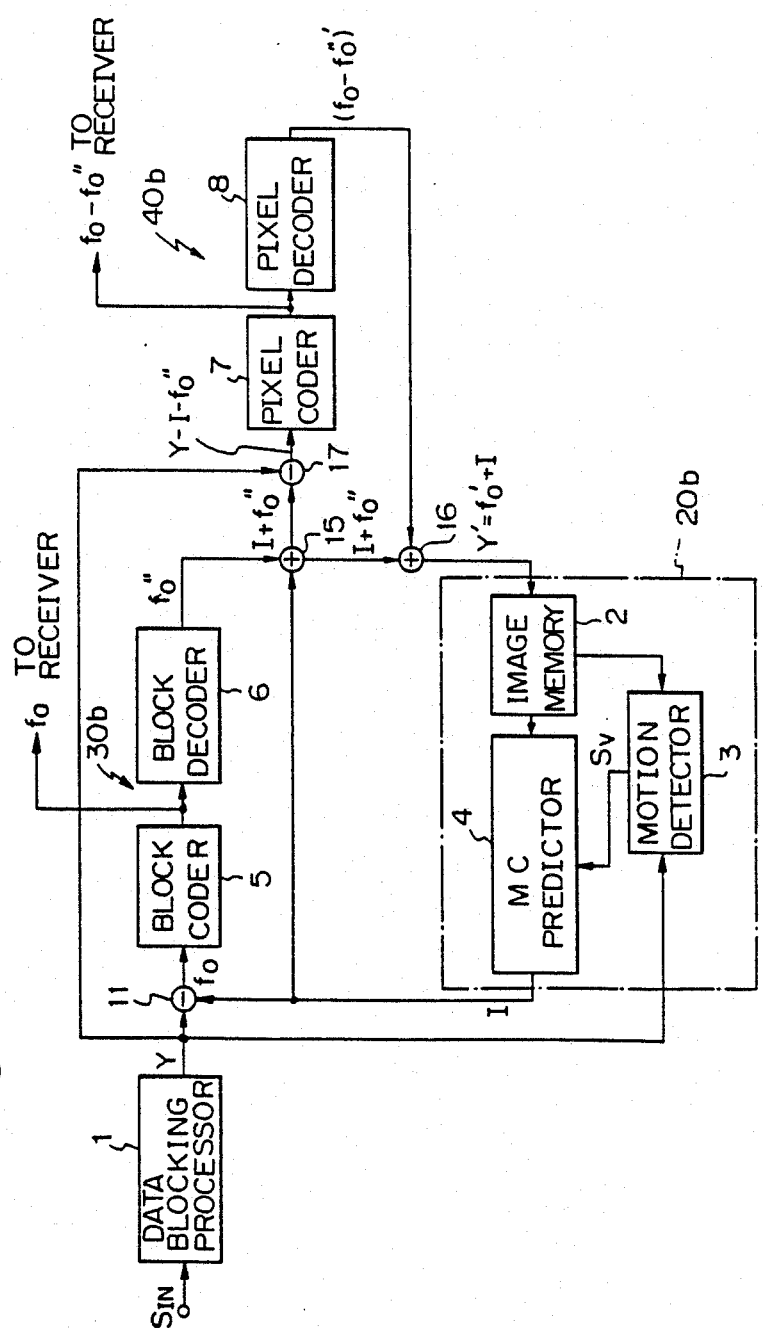
FIG. 13 is a block diagram of still another embodiment of a motion compensation interframe difference coding system according to the present invention.

FIG. 13 is a diagram of still another embodiment of an MCID coding system according to the present invention. The MCID coding system shown in FIG. 13 includes a data blocking processor 1, a block data redundancy compression and coding unit 30b, a PIXEL data coding unit 40b, and a prediction block data generator unit 20b, respectively, similar to the corresponding units 1, 30, 40, and 20 in FIG. 3. The MCID coding system of FIG. 13 differs from the MCID coding system of FIG. 3, in the overall construction thereof.

The block data encoder 5 may be realized by the circuit shown in FIG. 4a or 4b. The PIXEL data encoder 7 also may be realized by the circuit shown in FIG. 6.

A main difference between the MCID coding system of FIG. 13 and that of FIG. 3 is in the generation of a signal for the prediction. The block data redundancy compression and coding function and the PIXEL data coding function are substantially identical to those of the MCID coding system of FIG. 3.

In FIG. 13, the adder 15 receives block decoded data of an MC difference $f_0''$ from the block data decoder 6 and MC prediction data I from the prediction block data generator unit 20b and outputs decoded block data. The subtractor 17 outputs errors between the decoded block data and the input block data. The PIXEL data coder 7 codes the errors, and the PIXEL data decoder 8 decodes the coded data. The adder 16 receives the decoded block data from the adder 15 and the decoded data from the PIXEL data decoder 8 and outputs a final decoded data Y' to the prediction block data generator unit 20b.

The above final decoded data Y' is expressed by $Y' = f_0' + I$. This is identical to that in FIG. 3. Accordingly, the MCID coding system of FIG. 13 has the same function as the MCID coding system of FIG. 3.

Figure 14:
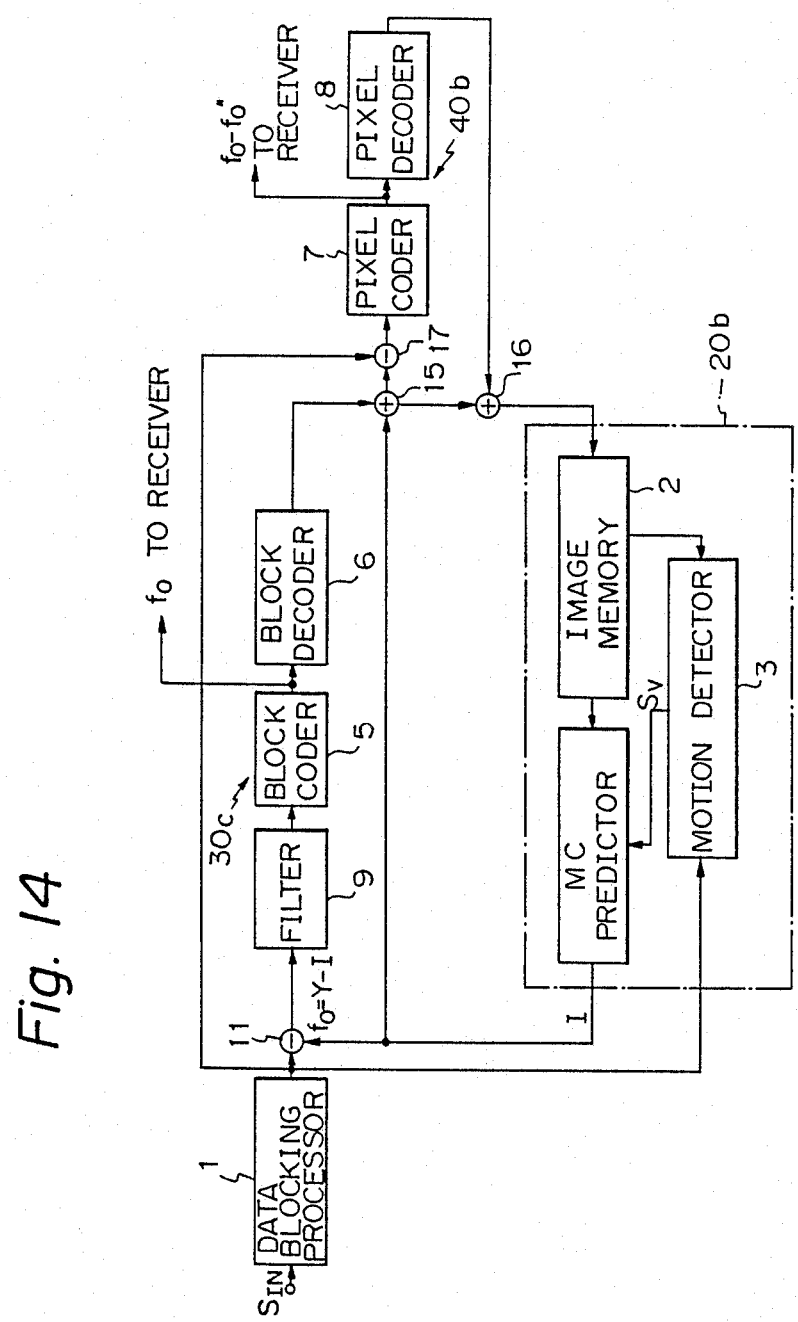
FIG. 14 is a block diagram of yet another embodiment of a motion compensation interframe difference coding system.

FIG. 14 is a block diagram of yet another embodiment of an MCID coding system according to the present invention. The MCID coding system includes a filter circuit 9 in addition to the MCID coding system in FIG. 13, to improve the coding when the MC difference contains the pulse components. The filter circuit 9 may be realized by the circuit shown in FIG. 10.

As described above, by suitably combining the block data redundancy compression and coding and the PIXEL data coding, a small amount of coded information, but enough to restore a source image with high quality, may be obtained. As a result, the coding system in the transmitter and the receiver of the present invention can be applied in a low data transmission speed communication system while maintaining high image quality.

Although interframing is used in the above embodiments infra-framing also can be applied in the system of the present invention.

Many widely different embodiments of the present invention may be constructed without departing from the spirit and scope of the present invention. It should be understood that the present invention is not limited to the specific embodiments described in this specification, except as defined in the appended claims.

We claim:

1. A motion compensation difference coding system for coding a motion difference of input image data, comprising:
   compression-coding means for compression-coding the motion difference to produce compression coded data and for decoding the compression coded data to produce decompressed data;
   error coding means, operatively connected in series with said compression-coding means to form series-connected means, for coding an error between the motion difference and the decompressed data to produce error coded data and for decoding the error coded data to produce decoded error data, when the error exceeds a predetermined value; and motion predicting means, operatively connected in parallel with said series-connected means, for producing decoded image data from the decompressed data, the decoded error data and predicted motion data and for calculating the motion difference as a difference between the input image data and the motion predicted data.

2. A motion compensation difference coding system according to claim 1,
further comprising means, operatively connected to said compression-coding means, said error coding means and said motion predicting means, for receiving an input image, and rearranging the input image in blocks, each having a plurality of first picture element data in a matrix, to produce the input image data,
wherein said compression-coding means codes and decodes the input image data in block form,
wherein said motion predicting means generates the motion difference in block form, and
wherein said error coding means comprises means for rearranging the error in block form as a plurality of second picture element data prior to coding the second picture element data in the error.

3. A motion compensation difference coding system according to claim 2, wherein said compression-coding means comprises:
means for two-dimensional transforming the input image data in block form to produce transformed data and for compression-coding the transformed data to produce coded block data, and
means for reverse two-dimensional transforming the coded block data.

4. A motion compensation difference coding system according to claim 3, wherein said two-dimensional transforming means comprises two-dimensional orthogonal transforming means, and said reverse two-dimensional transforming means comprises reverse two-dimensional orthogonal transforming means.

5. A motion compensation difference coding system according to claim 2, wherein said compression-coding means comprises vector quantization means, and reverse vector quantization means.

6. A motion compensation difference coding system according to claim 5, wherein said motion predicting means comprises:
memory means for storing the decoded image data;
motion detecting means for receiving an input image block and for indicating a decoded image block in said memory means closest to the input image block using a vector;
prediction means for outputting the motion predicted data in response to the vector; and
subtractor means for subtracting the motion predicted data from the input image data to produce the motion difference.

7. A motion compensation difference coding system according to claim 1, wherein said compression-coding means comprises a filter, operatively connected to said motion predicting means, for removing pulse components contained in the motion difference to produce a filtered motion difference; and
coding/decoding means for coding and decoding the filtered motion difference from which the pulse components have been removed.

8. A motion compensation difference coding system according to claim 7, wherein said filter receives the motion difference in block form, arranges the motion difference in a matrix form of picture element data with a center picture element, and selects filtered picture element data having a middle value thereof.

9. A motion compensation difference coding system for coding a motion difference of input image data, comprising:
compression-coding means for compression-coding the motion difference to produce compression coded data and for decoding the compression coded data to produce decompressed data;
error coding means, operatively connected in series with said compression-coding means, for coding an error between the input image data and the decompressed data added to motion predicted data to produce error coded data and for decoding the error coded data when the error exceeds a predetermined value; and
motion predicting means, operatively connected in parallel with said compression-coding means, for producing decoded image data from the decompressed data, the decoded error data and the motion predicted data and for calculating the motion difference as a difference between the input image data and the motion predicted data.

10. A motion compensation difference coding system according to claim 9,
further comprising means, operatively connected to said compression-coding means, said error coding means and said motion predicting means, for receiving an input image, and rearranging the input image in blocks each having a plurality of first picture element data in a matrix to produce the input image data,
wherein said compression-coding means codes and decodes the input image data in block form,
wherein said motion predicting means generates the motion difference in block form, and
wherein said error coding means comprises means for rearranging error in block form as a plurality of second picture element data prior to coding the second picture element data in the error.

11. A motion compensation difference coding system according to claim 10, wherein said compression-coding means comprises:
means for two-dimensional transforming the input image data in block form to produce transformed data and for compression-coding the transformed data to produce coded block data, and
means for reverse two-dimensional transforming the coded block data.

12. A motion compensation difference coding system according to claim 11, wherein said two-dimensional transforming means comprises two-dimensional orthogonal transforming means, and said reverse two-dimensional transforming means comprises reverse two-dimensional orthogonal transforming means.

13. A motion compensation difference coding system according to claim 10, wherein said compression-coding means comprises vector quantization means, and reverse vector quantization means.

14. A motion compensation difference coding system according to claim 13, wherein said motion predicting means comprises:
memory means for storing the decoded image data;
motion detecting means for receiving an input image block and indicating a decoded image block in said memory means closest to the input image block using a vector;

prediction means for outputting the motion predicted data in response to the vector; and subtractor means for subtracting the motion predicted data from the input image data to produce the motion difference.

15. A motion compensation difference coding system according to claim 9, wherein said compression-coding means comprises a filter, operatively connected to said motion predicting means, for removing pulse components contained in the motion difference to produce a filtered motion difference; and coding/decoding means for coding and decoding the filtered motion difference from which the pulse components have been removed.

16. A motion compensation difference coding system according to claim 15, wherein said filter receives the motion difference in block form, arranges the motion difference in a matrix display form of picture element data with a center picture element, and selects filtered picture element data having a middle value thereof.

* * * * *

UNITED STATES PATENT AND TRADEMARK OFFICE
CERTIFICATE OF CORRECTION

PATENT NO. : 4,805,017

DATED : February 14, 1989

INVENTOR(S) : Kaneko et al.

It is certified that error appears in the above-identified patent and that said Letters Patent is hereby corrected as shown below:

Col. 1, line 24, after "as" (1st occurrence) insert --small--.
line 25, delete "as"; delete "small".
Col. 5, line 63, after "3" insert --will--.
Col. 7, line 33, "4b" should be --4d--;
line 61, after "output" insert --from decoder 6--; "at" should be --by--.
Col. 9, line 31, after "value" (second occurrence) insert --of--.

Col. 7, line 61, "$f_0$" " should read -- ($f_0$") --.

Signed and Sealed this

Tenth Day of October, 1989

Attest:

DONALD J. QUIGG

Attesting Officer

Commissioner of Patents and Trademarks